US012480710B1

(12) United States Patent
Chen et al.

(10) Patent No.: US 12,480,710 B1
(45) Date of Patent: Nov. 25, 2025

(54) SURROUND HOT AIR SLOW DRYING DEVICE FOR PET FOOD PROCESSING AND THREE-STAGE BAKING METHOD

(71) Applicant: Shandong Hitrusty Industrial & Trading Co., Ltd., Liaocheng (CN)

(72) Inventors: Jinfa Chen, Liaocheng (CN); Yaoqing Liu, Liaocheng (CN); Wenhao Wang, Liaocheng (CN); Huanhuan Gu, Liaocheng (CN); Minghui Zhang, Liaocheng (CN)

( * ) Notice: Subject to any disclaimer, the term of this patent is extended or adjusted under 35 U.S.C. 154(b) by 0 days.

(21) Appl. No.: 19/271,818

(22) Filed: Jul. 17, 2025

(30) Foreign Application Priority Data

Nov. 29, 2024 (CN) ........................ 202411735340.9

(51) Int. Cl.
*F26B 11/18* (2006.01)
*F26B 3/04* (2006.01)
*F26B 11/04* (2006.01)

(52) U.S. Cl.
CPC ................ *F26B 11/18* (2013.01); *F26B 3/04* (2013.01); *F26B 11/044* (2013.01); *F26B 2200/06* (2013.01)

(58) Field of Classification Search
CPC .......... F26B 11/18; F26B 3/04; F26B 11/044; F26B 2200/06; F26B 15/02; F26B 15/04; F26B 15/06; F26B 15/08; F26B 15/085; F26B 21/00; F26B 25/18; F26B 25/02; F26B 25/04; A23K 40/10; A23K 50/42; A23N 17/00; A23N 17/002; A23N 17/004; A23N 17/007
See application file for complete search history.

(56) References Cited

FOREIGN PATENT DOCUMENTS

| | | | | |
|---|---|---|---|---|
| CN | 109990591 A | | 7/2019 | |
| CN | 111981810 A | * | 11/2020 | ............. F26B 11/18 |
| CN | 219264847 U | | 6/2023 | |
| CN | 219511195 U | | 8/2023 | |
| CN | 220169898 U | | 12/2023 | |
| CN | 118980231 A | | 11/2024 | |

OTHER PUBLICATIONS

Translation, CN-111981810-A (Year: 2020).*

* cited by examiner

*Primary Examiner* — Jessica Yuen

(57) ABSTRACT

A surround hot air slow drying device and a three-stage baking method for pet food processing are provided. The surround hot air slow drying device for pet food processing includes a drying box. A hot air drying unit is provided at an inner bottom of the drying box, a circulating conveying unit is provided inside the drying box, a plurality of drying frames are evenly distributed on the circulating conveying unit, a material turning mechanism is provided inside the drying frames, and a positioning component is provided inside the drying box. The material turning mechanism cooperates with the positioning component to turn the raw materials in the drying frames.

8 Claims, 6 Drawing Sheets

SURROUND HOT AIR SLOW DRYING DEVICE FOR PET FOOD PROCESSING AND THREE-STAGE BAKING METHOD

CROSS-REFERENCE TO RELATED APPLICATIONS

This application claims priority to Chinese Patent Application No. 202411735340.9, filed on Nov. 29, 2024, the entire disclosure of which is incorporated herein by reference.

TECHNICAL FIELD

The present application relates to the technical field of pet food processing, in particular to a surround hot air slow drying device for pet food processing and a three-stage baking method.

BACKGROUND

Pet food is specially designed for pets and small animals, mainly serving to provide the most basic nutritional substances necessary for various pets to ensure their life, promote growth and development, and maintain health.

During the processing of meat-based pet food, the meat materials need to be rolled into granules and then dried to dehydrate and crisp them. In the drying process of meat-based pet food, food granules are placed in the cylinder of drying device, and a material turning mechanism inside drives the food granules to turn and contact with hot air to achieve dehydration and drying. For example, the patent No. CN117647079A in the related art discloses a sterile drying device for pet food processing, which uses a plurality of hollow plates to stir the pet food raw materials on the inner wall of the drying cylinder, prompting the static raw materials to tumble and avoiding mutual condensation. Due to material passing holes, some raw materials can pass through the hollow plates, and air holes are set on the outer sides of the hollow plates to directly discharge hot air into the interior of the raw materials, releasing heat from the inside of the pet food raw materials.

However, the related art still has the following defects: during the stirring process of pet food raw materials, the raw materials at the corners are prone to fragmentation due to friction and extrusion between the hollow plates and the cylinder. Moreover, the pet food raw materials will fall from a height a plurality of times, and the impact during falling easily causes the raw materials to break and generate debris, thereby reducing the yield and production quality of pet food.

SUMMARY

In view of the problem in the related art that pet food particles are broken during the stirring process, a surround hot air slow drying device for pet food processing is proposed.

Objective is to realize the turning of food particles on the drying frame through the translation of the material turning plate, and combine the reciprocating movement of the direction adjustment plate to make the food particles spread in an S-shape, so as to avoid damage to the food particles and improve the drying effect.

The technical solution of the present application is a surround hot air slow drying device for pet food processing, including:

a drying box, provided with a hot air drying unit at a bottom, wherein a circulating conveying unit is provided in the drying box, the circulating conveying unit comprises chains provided on symmetrical sides inside the drying box, the chains are rectangular, a plurality of drying frames are evenly distributed on the chains, a material turning mechanism is provided inside the plurality of drying frames, a positioning component is provided in the drying box, and the material turning mechanism cooperates with the positioning component to turn raw materials in the plurality of drying frames;

wherein the material turning mechanism comprises a material turning module and a driving module, the material turning module comprises a material turning plate slidably matched with the plurality of drying frames, a cross-section of the material turning plate is an isosceles triangle structure, a direction adjustment plate is provided at the top of the material turning plate, a plurality of first fixing plates are evenly distributed on an inclined surface of the material turning plate, the direction adjustment plate comprises an arc-shaped plate slidably matched with the material turning plate, a plurality of second fixing plates are evenly distributed on the arc-shaped plate, and the driving module is provided inside the material turning plate and used for driving the direction adjustment plate to move reciprocally;

wherein the driving module comprises a rotating shaft rotatably connected with the material turning plate, a reciprocating screw rod is fixedly connected to the middle of the rotating shaft, a sliding sleeve is slidably connected to the reciprocating screw rod, and a sliding sleeve is fixedly connected with the arc-shaped plate;

an end of the rotating shaft passes through each drying frame and is fixedly connected with a gear, and one side of the gear is meshed with a rack, the rack is fixedly connected to the drying frame;

the positioning component comprises a positioning rod elastically connected with the drying box, the rotating shaft is in abutting fit with the positioning rod;

the positioning component further comprises a trapezoidal block provided at a corner of the drying frame, the trapezoidal block is in sliding contact with the positioning rod, a connection seat is slidably connected to the positioning rod, one end of the positioning rod is elastically connected with the connection seat through a first spring, the connection seat is fixedly connected to the drying box, and the connection.

By adopting the above technical solution, the product particles are spread flat on the drying frame. The circulating conveying unit drives each drying frame to move circularly, and the hot air drying unit generates hot air in the drying box. When the hot air passes through the drying frame, it removes moisture from the product particles. Whenever the drying frame moves near the positioning component, the driving module abuts against the positioning rod to keep the material turning plate stationary, while the drying frame continues to move, so that the material turning plate turns the piled food particles in the drying frame. Meanwhile, the rotation of the driving module drives the direction adjustment plate to move reciprocally, so as to guide the sliding of the food particles passing through the top of the material turning plate, so that the food particles are scattered in an S shape on the other side of the drying frame, to realize the replacement of the position of the food particles, so that each side of the product particles can be in contact with the hot air. By using one end of the material turning plate and the reciprocating movement of the direction adjustment plate, the damage to the food particles is avoided, and the drying effect is improved.

In one embodiment, the hot air drying unit includes a fan and a heating element fixedly provided at the bottom inside the drying box, and the heating element is provided above the fan.

By adopting the above technical solution, the heating element is a heating rod. The heating element is heated to the working temperature, and the fan rotates to drive the airflow in the drying box to move in a circular motion, so that the flowing hot air contacts the food particles, to remove moisture in the food particles.

In one embodiment, the circulating conveying unit includes chains provided on the symmetrical sides inside the drying box, the chains are rectangular, and four chain wheels are meshed with the chains, the chain wheels are rotatably connected with the drying box, a motor is coaxially connected to one of the chain wheels, and the motor is fixedly installed on the outer side of the drying box.

By adopting the above technical solution, the two motors rotate synchronously, and the two chains cooperate to drive the drying frames to move clockwise in a rectangular structure.

In one embodiment, each drying frame is connected with the chains through a connection piece, the connection piece includes a lifting rod, a connection frame is fixedly connected between an end of the lifting rod and the drying frame, an insertion rod is elastically connected inside the end of the lifting rod through a second spring, one end of the insertion rod is in plug-in fit with a socket, and the socket is fixedly provided on the chains.

By adopting the above technical solution, the insertion rod is of an L-shaped structure, and one end of the insertion rod passes through the lifting rod and extends to the outside. The second spring drives one end of the insertion rod to be connected with the socket, so that the lifting rod can set the drying frame on the chain. By pulling the insertion rod toward the middle of the lifting rod to cancel the plug-in connection of the insertion rod with the socket, the drying frame can be removed from the chain, which is convenient for placing or taking out food particles on the drying frame.

In one embodiment, a plurality of first fixing plates are evenly distributed on the inclined surface of the material turning plate, and the direction adjustment plate includes an arc-shaped plate slidably matched with the material turning plate, and a plurality of second fixing plates are evenly distributed on the arc-shaped plate.

By adopting the above technical solution, when the drying frame moves and the material turning plate remains stationary, the food particles on the side of the drying frame opposite to the moving direction come into contact with the material turning plate and form a pile. When the pile height exceeds that of the material turning plate, the particles slide down along one inclined surface of the material turning plate to another side of the drying frame, realizing the turning and repositioning of food particles. Meanwhile, when the food particles are on the arc-shaped plate, the arc-shaped plate drives the second fixing plates to swing reciprocally, causing the food particles to scatter in an S-shape and improving the turning effect on the food particles.

In one embodiment, the driving module includes a rotating shaft rotatably connected to the material turning plate, with a reciprocating screw rod fixedly connected to the middle of the rotating shaft, a sliding sleeve is slidably connected to the reciprocating screw rod, and the sliding sleeve is fixedly connected to the arc-shaped plate; and an end of the rotating shaft penetrates the drying frame and is fixedly connected to a gear, with one side of the gear meshed with a rack that is fixedly connected to the drying frame.

By adopting the above technical solution, during the horizontal movement of the drying frame, the rotating shaft on the drying frame abuts against the lower end of the positioning rod. At this time, when the drying frame continues to move, the rotating shaft keeps the material turning plate stationary, so that the material turning plate can turn the food particles in the process of moving to the other side of the drying frame. After the material turning plate moves to another side of the drying frame, the inclined surface of the trapezoidal block on the side close to the material turning plate abuts against the driving rod, so that the positioning rod rises to cancel the limit on the rotating shaft, and then the material turning plate can move synchronously with the drying frame.

In one embodiment, baffles are vertically and slidably connected to the symmetrical sides of the drying frame, one side of each baffle is elastically connected with the drying frame through a third spring, and a yielding hole adapted to the first fixing plate is formed in each baffle.

By adopting the above technical solution, when the material turning plate moves toward the side of the drying frame, the inclined surface of the material turning plate close to the baffle slides and contacts the lower end of the baffle, and drives the baffle to rise vertically. This allows the baffle to push the food particles at the corners of the drying frame to the other side of the material turning plate, avoiding dead corners during turning and improving the turning effect on the food particles.

In one embodiment, a plurality of air guide plates are fixedly provided in the middle of the drying box, and the plurality of air guide plates are provided in a stepped structure.

By adopting the above technical solution, each air guide plate is provided obliquely, and a plurality of air guide plates are symmetrically provided in two groups above the fan. The hot air generated by the fan moves upward and is directed to both sides by the air guide plates, so that the bottom of the drying frame can effectively contact the hot air during vertical movement. The hot air flows through the through-holes on the surface of the food particles to further improve the drying effect. Meanwhile, the air guide plates make the hot air form two circular airflows inside the drying box, further enhancing the contact effect of the hot air and the food particles.

Another purpose of the present application is to a three-stage baking method for pet food, its purpose is: through three-stage drying, the pet food adopts different temperatures and different durations in each drying process to reduce nutrient loss of ingredients and form crispy granules.

To achieve the above purpose, the present application provides the following technical solution: a three-stage baking method for pet food, which includes:

S1. raw material preparation and processing: mixing fresh meat, starch, fruits and vegetables, and nutrients, and rolling the mixed raw materials into granules suitable for cats and dogs to eat through food rolling equipment;

S2. flash evaporation at 65° C.: putting the rolled granules into a flash evaporation drying device at 65° C. and heating for two hours to reduce a water content of fresh meat ingredients and concentrate nutrients;

S3. hot air slow drying at 85° C.: putting the flash-evaporated food granules on a drying frame, the hot air drying unit generating circulating hot air at 85° C., and the circulating conveying unit driving each drying frame to rotate for two hours to make a moisture of the granules slowly evaporate and form crispy granules;

S4. short-term heating at 100° C.: putting the slowly dried food granules into a baking equipment at 100° C. and heating for one hour to promote the raw materials to undergo a mild maillard reaction and reduce nutrient loss;

S5. cooling and detection: cooling the baked food granules, detecting their moisture content, the food granules meeting requirements entering a next process, and food granules not meeting the requirements being baked again.

Compared with the related art, the present application has the following beneficial effects:

1. During the horizontal movement of the drying frame, the material turning plate moves inside the drying frame to turn the food particles on the drying frame. Meanwhile, the arc-shaped plate cooperates with the second fixing plate to perform reciprocating motion, so that the turned food particles are scattered in an S shape, thereby avoiding damage to the food particles, and realizing the replacement of the surface of the food particles in contact with hot air, thus the yield of pet food is improved, and the drying effect is enhanced.

2. When the material turning plate moves toward the side of the drying frame, its inclined surface drives the baffle to rise vertically. The baffle and the material turning plate cooperate to turn the product particles on the side of the drying frame to the other side, avoiding dead corners in the turning of the particles and ensuring that all particles within the drying frame can be turned.

3. The air guide plates can not only increase the contact range of hot air with the drying frame and food particles, but also form two circular airflows in the drying box, thereby further improving the drying effect on the food particles.

4. Through the three-stage baking process for pet food ingredients, the gelatinization degree of starch in the baked pet food can be increased to more than 90%, making the starch in the pet food easy to be hydrolyzed by enzymes and conducive to digestion and absorption. And it can improve the texture and taste of pet food.

DETAILED DESCRIPTION OF THE EMBODIMENTS

Figure 1:
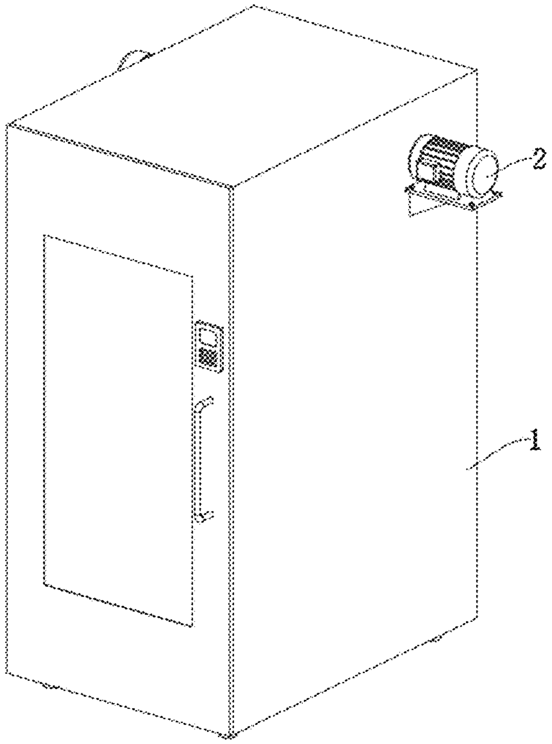
FIG. 1 is a three-dimensional structural schematic diagram of the overall application.

To make the above objects, features and advantages of the present application more obvious and understandable, the specific implementation manners of the present application will be described in detail below with reference to the drawings in the specification.

Embodiment 1, with reference to FIGS. 1 to 12, is the first embodiment of the present application, it provides a surround hot air slow drying device for pet food processing, including a drying box 1. A hot air drying unit is provided at the bottom of the drying box 1, a circulating conveying unit 2 is provided inside the drying box 1, a plurality of drying frames 3 are evenly distributed on the circulating conveying unit 2, a material turning mechanism is provided inside the drying frames 3, and a positioning component 7 is provided inside the drying box 1. The material turning mechanism cooperates with the positioning component 7 to turn the raw materials in the drying frames 3. The material turning mechanism includes a material turning module 5 and a driving module 6. The material turning module 5 includes a material turning plate 501 slidably matched with the drying frame 3. A cross-section of the material turning plate 501 is of an isosceles triangle structure, a direction adjustment plate is provided at a top of the material turning plate 501. The driving module 6 is provided inside the material turning plate 501, and is used for driving the direction adjustment plate to move reciprocally. The positioning component 7 includes a positioning rod 701 elastically connected with the drying box 1, the driving module 6 is in abutting fit with the positioning rod 701, the positioning component 7 further includes a trapezoidal block 704 provided at the corner of the drying frame 3, and the trapezoidal block 704 is in sliding contact with the positioning rod 701.

Specifically, the pet food particles are laid flat on each drying frame 3, the circulating conveying unit 2 drives each drying frame 3 to perform circular motion, the hot air drying unit generates hot air in the drying box 1, and when the hot air passes through the drying frame 3, it removes moisture from the pet food particles. Whenever the drying frame 3 moves near the positioning component 7, the driving module 6 abuts against the positioning rod 701 to keep the material turning plate 501 stationary, while the drying frame 3 continues to move, so that the material turning plate 501 turns the piled food particles in the drying frame 3, and the driving module 6 rotates to drive the direction adjustment plate to move reciprocally, so as to guide the sliding of the food particles passing through the top of the material turning plate 501, so that the food particles are scattered in an S shape on another side of the drying frame 3, to replace the position of the food particles, so that each side of the food particles can be in contact with the hot air. By using one end of the material turning plate 501 and the reciprocating movement of the direction adjustment plate, the damage to the food particles is avoided, and the drying effect is improved.

The bottom of the drying frame 3 is provided with a plurality of through holes, and a diameter of the through holes is smaller than a diameter of the pet food particles, so that part of the hot air can pass through the through holes to contact the food particles at the bottom of the drying frame 3.

Figure 2:
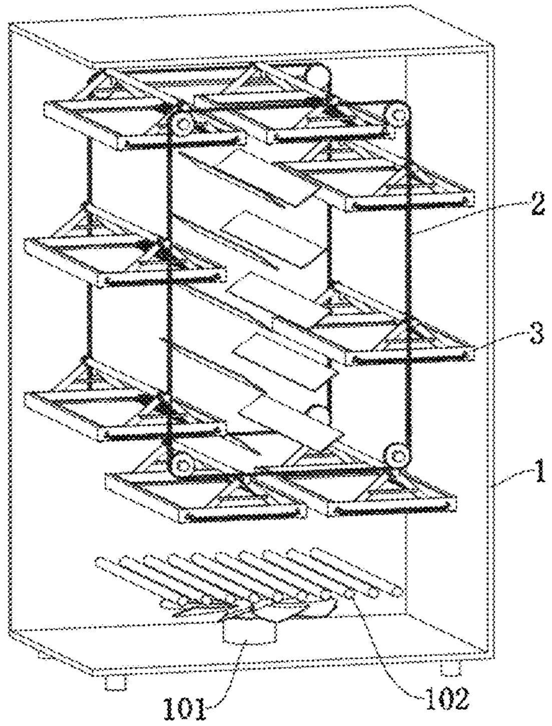
FIG. 2 is a structural anatomical schematic diagram of the drying box.

With reference to FIGS. 1 to 2, the hot air drying unit includes a fan 101 and a heating element 102 fixedly provided at an inner bottom of the drying box 1, and the heating element 102 is provided above the fan 101.

Specifically, the heating element 102 adopts a heating rod, the heating element 102 is heated to the working temperature, and the fan 101 rotates to drive the airflow in the drying box 1 to perform circular motion, so that the flowing hot air contacts the food particles, thereby removing moisture from the food particles.

The drying box 1 is composed of a box body and a box door. A control module is provided on the box door, a temperature and humidity sensor is provided at an inner top of the box body, and the temperature and humidity sensor, the fan 101, and the heating element 102 are all in signal connection with the control module. The control module controls the heating element 102 to heat to the working temperature, controls the fan 101 to rotate to drive the airflow in the drying box 1 to perform circular motion, the temperature and humidity sensor monitors the temperature and humidity data in the drying box 1, and displays them on the control module.

Figure 3:
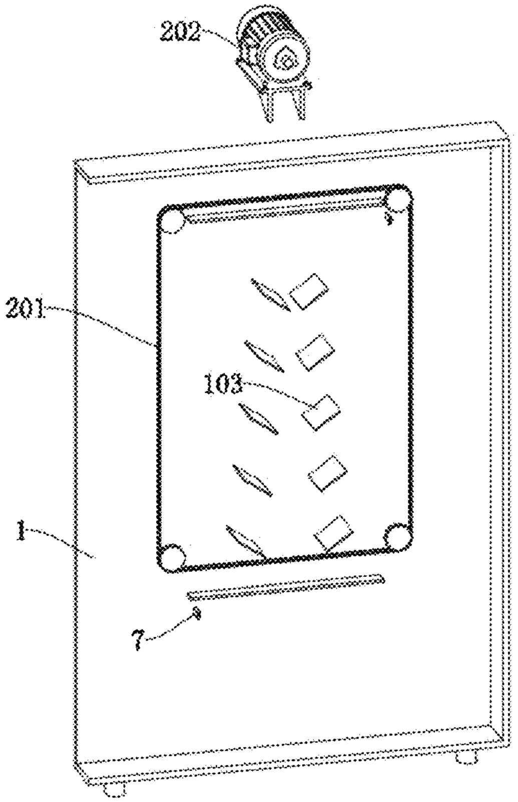
FIG. 3 is a schematic diagram of the circulating conveying unit structure.
Figure 4:
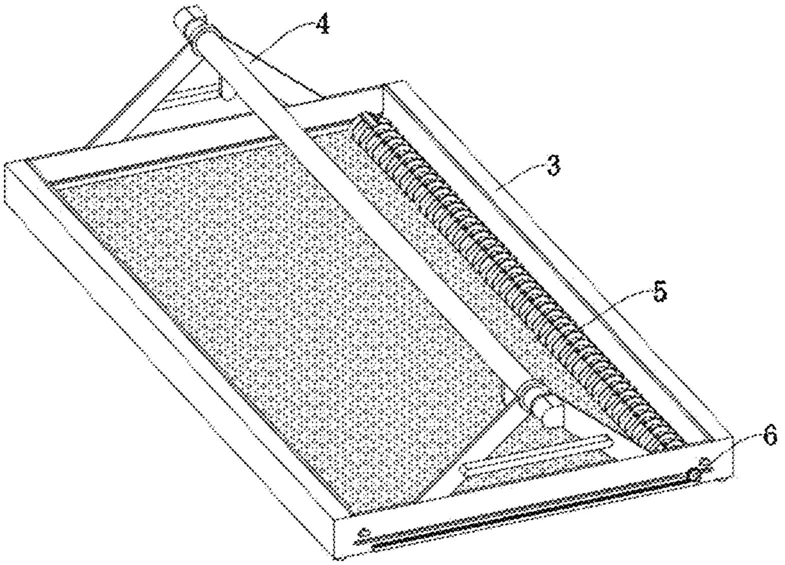
FIG. 4 is a structural schematic diagram of the drying frame and the material turning module.
Figure 5:
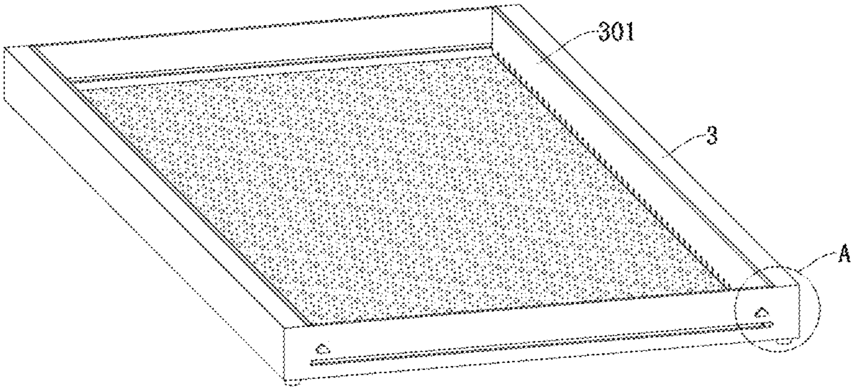
FIG. 5 is a structural schematic diagram of the drying frame and the baffle.
Figure 6:
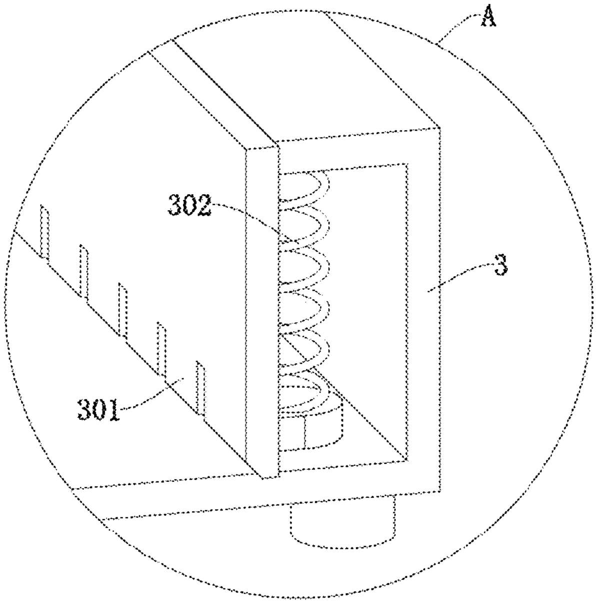
FIG. 6 is a structural anatomical enlarged schematic diagram of part A in FIG. 5.

With reference to FIG. 3, the circulating conveying unit 2 includes chains 201 provided on the symmetrical sides inside the drying box 1. The chains 201 are rectangular, four chain wheels are meshed with the chains 201, the chain wheels are rotatably connected with the drying box 1, a motor 202 is coaxially connected to one of the chain wheels, and the motor 202 is fixedly provided on the outer side of the drying box 1.

Specifically, the motor 202 is in signal connection with the control module, two motors 202 rotate synchronously, and the two chains 201 cooperate to drive the drying frames 3 to move clockwise in a rectangular structure.

Figure 7:
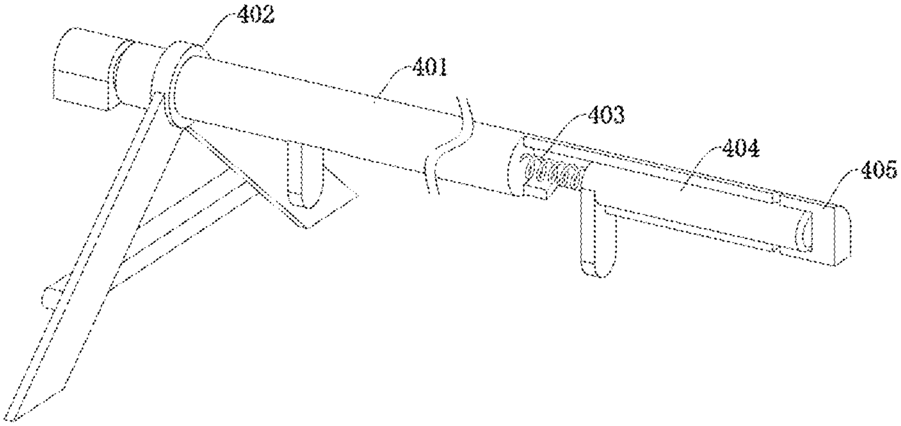
FIG. 7 is a structural anatomical schematic diagram of the connection piece.

With reference to FIG. 7, the drying frame 3 is connected with the chain 201 through a connection piece 4. The connection piece 4 includes a lifting rod 401. A connection frame 402 is fixedly connected between the end of the lifting rod 401 and the drying frame 3, an insertion rod 404 is elastically connected inside the end of the lifting rod 401 through a second spring 403, one end of the insertion rod 404 is in plug-in fit with a socket 405, and the socket 405 is fixedly provided on the chain 201.

Specifically, the insertion rod 404 is of an L-shaped structure, and one end of the insertion rod passes through the lifting rod 401 and extends to the outside. The second spring 403 drives one end of the insertion rod 404 to be connected with the socket 405, so that the lifting rod 401 can set the drying frame 3 on the chain 201. By pulling the insertion rod 404 toward the middle of the lifting rod 401 to cancel the plug-in connection of the insertion rod 404 with the socket 405, the drying frame 3 can be removed from the chain 201, which is convenient for placing or taking out food particles on the drying frame 3.

Figure 8:
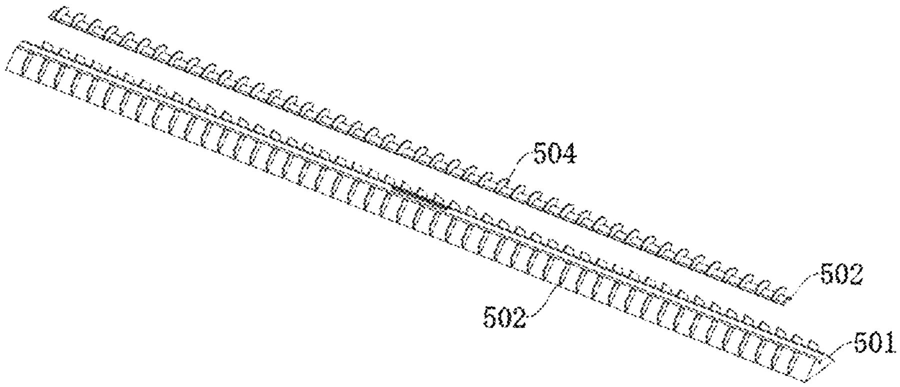
FIG. 8 is a structural disassembly schematic diagram of a material turning module.

With reference to FIG. 8, a plurality of first fixing plates 502 are evenly distributed on the inclined surface of the material turning plate 501. The direction adjustment plate includes an arc-shaped plate 503 slidably matched with the material turning plate 501, and a plurality of second fixing plates 504 are evenly distributed on the arc-shaped plate 503.

Specifically, when the drying frame 3 moves and the material turning plate 501 is stationary, the food particles on the side of the drying frame 3 opposite to the moving direction contact the material turning plate 501 and form a pile. When the pile height is higher than that of the material turning plate 501, the food particles slide down along one inclined surface of the material turning plate 501 to the other side of the drying frame 3, so as to realize the turning and position changing of the food particles. When the food particles are on the arc-shaped plate 503, the arc-shaped plate 503 drives the second fixing plates 504 to swing reciprocally, so that the food particles are scattered in an S shape, thereby improving the turning effect on the food particles.

Figure 9:
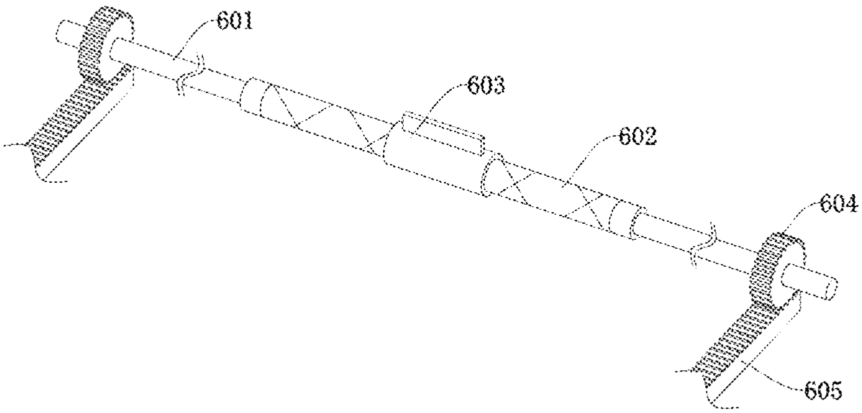
FIG. 9 is a structural schematic diagram of a driving module.
Figure 10:
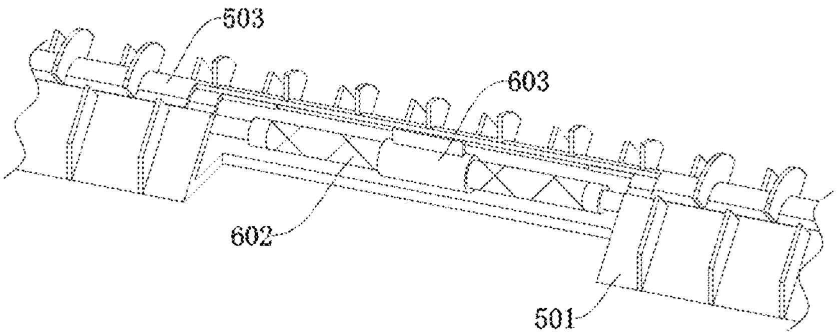
FIG. 10 is a structural anatomical schematic diagram of the material turning plate and the arc-shaped plate.

With reference to FIG. 9, the driving module 6 includes a rotating shaft 601 rotatably connected with the material turning plate 501. A reciprocating screw rod 602 is fixedly connected to the middle of the rotating shaft 601, a sliding sleeve 603 is slidably connected to the reciprocating screw rod 602, and the sliding sleeve 603 is fixedly connected with the arc-shaped plate 503. The end of the rotating shaft 601 penetrates the drying frame 3 and is fixedly connected with a gear 604, one side of the gear 604 is meshed with a rack 605, and the rack 605 is fixedly connected to the drying frame 3.

Specifically, after the rotating shaft 601 abuts against the positioning rod 701, the drying frame 3 continues to move, so that the rack 605 drives the gear 604 to rotate. The rotating shaft 601 drives the reciprocating screw rod 602 to rotate synchronously, so that the sliding sleeve 603 performs reciprocating motion, thereby driving the arc-shaped plate 503 to perform reciprocating motion synchronously.

Figure 11:
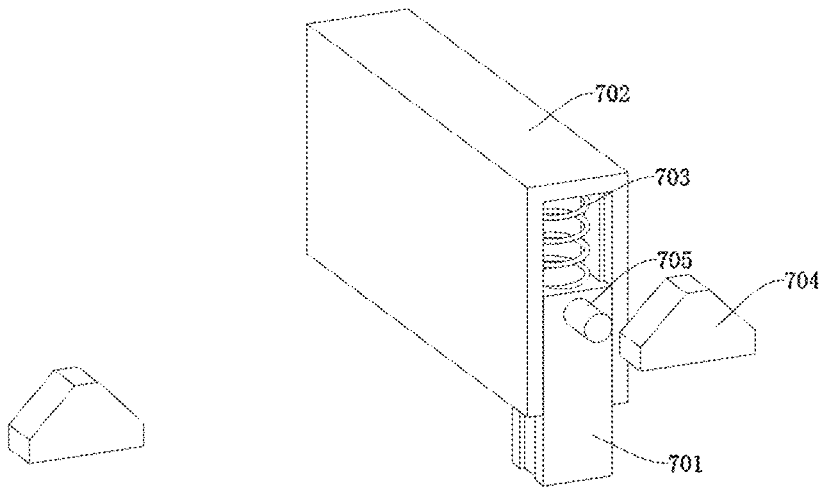
FIG. 11 is a structural schematic diagram of the positioning component.
Figure 12:
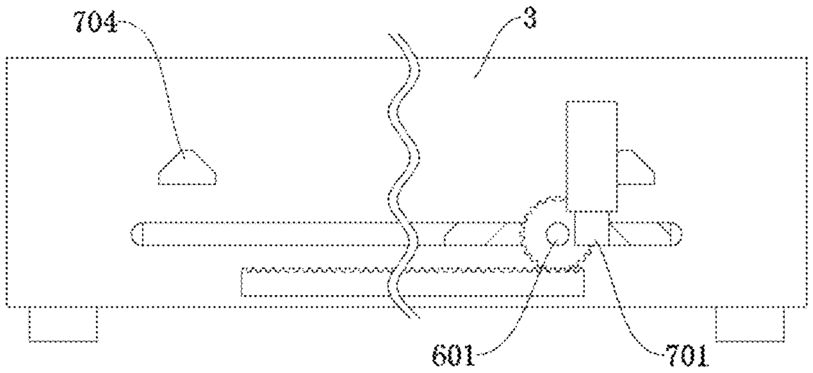
FIG. 12 is a schematic diagram of the structural cooperation among the drying frame, the rotating shaft and the positioning rod.

With reference to FIG. 11, a connection seat 702 is slidably connected to the positioning rod 701, the connection seat 702 is fixedly connected to the drying box 1, and one end of the positioning rod 701 is elastically connected to the connection seat 702 through a first spring 703. A driving rod 705 is fixedly connected to one end of the positioning rod 701, and the trapezoidal block 704 is in sliding contact with the driving rod 705.

Specifically, during the horizontal movement of the drying frame 3, the rotating shaft 601 on the drying frame 3 abuts against the lower end of the positioning rod 701. At this time, when the drying frame 3 continues to move, the rotating shaft 601 keeps the material turning plate 501 stationary, so that the material turning plate 501 turns the food particles in the process of moving to the other side of the drying frame 3. After the material turning plate 501 moves to the other side of the drying frame 3, the inclined surface of the trapezoidal block 704 on the side close to the material turning plate 501 abuts against the driving rod 705, so that the positioning rod 701 rises to cancel the limit on the rotating shaft 601, and then the material turning plate 501 can move synchronously with the drying frame 3.

With reference to FIGS. 3 and 11, the connection seat 702 is provided at an upper right corner inside the chain 201 and at a lower left side outside the chain 201, so that the material turning plate 501 moves from right to left when the drying frame 3 translates to the right on the upper side of the chain 201, and the material turning plate 501 moves from left to right when the drying frame 3 translates to the left on the lower side of the chain 201. When the drying frame 3 follows the chain 201 to complete a circle of movement, the material turning plate 501 performs a reciprocating movement, and turns the food particles in the drying frame 3 twice.

Embodiment 2, with reference to FIGS. 4 to 8, is the second embodiment of the present application, which is different from the first embodiment in that: baffles 301 are vertically and slidably connected to symmetrical sides of the drying frame 3. One side of each baffle 301 is elastically connected to the drying frame 3 through a third spring 302, and a yielding hole adapted to the first fixing plate 502 is formed in each baffle 301.

Specifically, when the material turning plate 501 moves toward the side of the drying frame 3, the inclined surface of the material turning plate 501 close to the baffle 301 slides and contacts the lower end of the baffle 301, and drives the baffle 301 to rise vertically, so that the baffle 301 can push the food particles at the corners of the drying frame 3 to the other side of the material turning plate 501, avoiding dead corners in turning and improving the turning effect on the food particles. The rest of the structure is the same as that of Embodiment 1.

Embodiment 3, with reference to FIGS. 2 to 3, is the third embodiment of the present application, which is different from the second embodiment in that: a plurality of air guide plates 103 are fixedly provided in the middle of the drying box 1, and the plurality of air guide plates 103 are provided in a stepped structure.

Specifically, each air guide plate 103 is provided obliquely, the plurality of air guide plates 103 are symmetrically provided in two groups, and are provided above the fan 101. The hot air moving upward generated by the fan 101 is directed to both sides by each air guide plate 103, so that the bottom of the drying frame 3 can effectively contact the hot air during the vertical movement. The hot air flows through the through holes on the surface of the food particles to further improve the drying effect on the food particles. And under the action of the air guide plates 103, the hot air forms two circular airflows inside the drying box 1, further enhancing the contact effect of the hot air and the food particles. The rest of the structure is the same as that of Embodiment 2.

Embodiment 4, with reference to FIGS. 1 to 12, is the fourth embodiment of the present application, and it provides a three-stage baking method for pet food, including:

- S1. raw material preparation and processing: mixing fresh meat, starch, fruits and vegetables, and nutrients, and rolling the mixed raw materials into granules suitable for cats and dogs to eat through food rolling equipment;
- S2. flash evaporation at 65° C.: putting the rolled granules into a flash evaporation drying device at 65° C. and heating for two hours to reduce a water content of fresh meat ingredients and concentrate nutrients;
- S3. hot air slow drying at 85° C.: putting the flash-evaporated food granules on a drying frame, the hot air drying unit generating circulating hot air at 85° C., and the circulating conveying unit driving each drying frame to rotate for two hours to make a moisture of the granules slowly evaporate and form crispy granules;
- S4. short-term heating at 100° C.: putting the slowly dried food granules into a baking equipment at 100° C. and heating for one hour to promote the raw materials to undergo a mild maillard reaction and reduce nutrient loss;
- S5. cooling and detection: cooling the baked food granules, detecting their moisture content, the food granules meeting requirements entering a next process, and food granules not meeting the requirements being baked again.

After the pet food undergoes the three-stage baking of S2 to S4, the starch in the baked grain in the raw materials absorbs water and swells at high temperature, so that the gelatinization degree of the starch in the baked grain is increased to more than 90%. By increasing the gelatinization degree, the starch in the raw materials is easy to be hydrolyzed by enzymes, which is beneficial to digestion and absorption, and can improve the texture and taste of the pet food.

Combining embodiments 1 to 4, the working principles of the present application: the granules after 65° C. flash evaporation are laid flat on each drying frame 3, the box door is closed, and the fan 101 and the heating element 102 are turned to form a hot air environment of 85° C. in the drying box 1. The motor 202 drives the chain 201 to rotate clockwise. Under the action of the air guide plates 103, the hot air forms a circular airflow in the drying box 1 and contacts the bottom of the moving drying frame 3 and the surface of the food particles. During the horizontal movement of the drying frame 3, the rotating shaft 601 on the drying frame 3 is driven to abut against the lower end of the positioning rod 701. At this time, when the drying frame 3 continues to move, the rotating shaft 601 keeps the material turning plate 501 stationary, so that the material turning plate 501 moves to another side of the drying frame 3. At this time, when the drying frame 3 moves, the rack 605 drives the gear 604 to rotate, the rotating shaft 601 drives the reciprocating screw rod 602 to rotate synchronously, the sliding sleeve 603 performs reciprocating motion, and the arc-shaped plate 503 performs reciprocating motion synchronously. In the process of the material turning plate 501 moving relative to the drying frame 3, it cooperates with the second fixing plates 504 to scatter the food particles in an S shape to another side, so that the food particles continue to contact the hot air after changing the position. After the material turning plate 501 moves to another side of the drying frame 3, the inclined surface of the trapezoidal block 704 on the side close to the material turning plate 501 abuts against the driving rod 705, so that the positioning rod 701 rises to cancel the limit on the rotating shaft 601, and then the material turning plate 501 follows the drying frame 3 to move synchronously.

After two hours of drying, stop the work of the fan 101, the heating element 102, and the motor 202, open the box door, and after the temperature is reduced, pull the insertion rod 404 toward the middle of the lifting rod 401 to cancel the plug-in connection between the insertion rod 404 and the socket 405, so that the drying frame 3 can be removed from the chain 201, which is convenient for taking out the food particles on the drying frame 3.

It should be noted that the above embodiments are only used to illustrate the technical solutions of the present application, but not to limit them.

What is claimed is:

1. A surround hot air slow drying device for pet food processing, comprising:

a drying box, provided with a hot air drying unit at a bottom, wherein a circulating conveying unit is provided in the drying box, the circulating conveying unit comprises chains provided on symmetrical sides inside the drying box, the chains are rectangular, a plurality of drying frames are evenly distributed on the chains, a material turning mechanism is provided inside the plurality of drying frames, a positioning component is provided in the drying box, and the material turning mechanism cooperates with the positioning component to turn raw materials in the plurality of drying frames;

wherein the material turning mechanism comprises a material turning module and a driving module, the material turning module comprises a material turning plate slidably matched with the plurality of drying frames, a cross-section of the material turning plate is an isosceles triangle structure, a direction adjustment plate is provided at a top of the material turning plate, a plurality of first fixing plates are evenly distributed on an inclined surface of the material turning plate, the direction adjustment plate comprises an arc-shaped plate slidably matched with the material turning plate, a plurality of second fixing plates are evenly distributed on the arc-shaped plate, and the driving module is provided inside the material turning plate and used for driving the direction adjustment plate to move reciprocally;

wherein the driving module comprises a rotating shaft rotatably connected with the material turning plate, a reciprocating screw rod is fixedly connected to the middle of the rotating shaft, a sliding sleeve is slidably connected to the reciprocating screw rod, and a sliding sleeve is fixedly connected with the arc-shaped plate;

an end of the rotating shaft passes through each drying frame and is fixedly connected with a gear, and one side of the gear is meshed with a rack, the rack is fixedly connected to the drying frame;

the positioning component comprises a positioning rod elastically connected with the drying box, the rotating shaft is in abutting fit with the positioning rod;

the positioning component further comprises a trapezoidal block provided at a corner of the drying frame, the trapezoidal block is in sliding contact with the positioning rod, a connection seat is slidably connected to the positioning rod, one end of the positioning rod is elastically connected with the connection seat through a first spring, the connection seat is fixedly connected to the drying box, and the connection seat is provided on an upper right side inside the chain and a lower left side outside the chains.

2. The surround hot air slow drying device for pet food processing according to claim 1, wherein the hot air drying unit comprises a fan and a heating element fixedly provided at the bottom inside the drying box, and the heating element is provided above the fan.

3. The surround hot air slow drying device for pet food processing according to claim 1, wherein four chain wheels are meshed with the chains, the chain wheels are rotatably connected with the drying box, a motor is coaxially connected to one of the chain wheels, and the motor is fixedly provided on an outer side of the drying box.

4. The surround hot air slow drying device for pet food processing according to claim 3, wherein each drying frame is connected with the chains through a connection piece, the connection piece comprises a lifting rod, a connection frame is fixedly connected between an end of the lifting rod and the drying frame, an insertion rod is elastically connected inside the end of the lifting rod through a second spring, one end of the insertion rod is in plug-in fit with a socket, and the socket is fixedly provided on the chains.

5. The surround hot air slow drying device for pet food processing according to claim 4, wherein baffles are vertically and slidably connected to the symmetrical sides of the drying frame, one side of each baffle is elastically connected with the drying frame through a third spring, and a yielding hole adapted to the first fixing plate is formed in each baffle.

6. The surround hot air slow drying device for pet food processing according to claim 1, wherein one end of the positioning rod is fixedly connected with a driving rod, and the trapezoidal block is in sliding contact with the driving rod.

7. The surround hot air slow drying device for pet food processing according to claim 1, wherein a plurality of air guide plates are fixedly provided in the middle of the drying box, and the plurality of air guide plates are provided in a stepped structure.

8. A three-stage baking method for pet food, using the surround hot air slow drying device for pet food processing according to claim 1, comprising:

S1. raw material preparation and processing: mixing fresh meat, starch, fruits and vegetables, and nutrients, and rolling the mixed raw materials into granules suitable for cats and dogs to eat through food rolling equipment;

S2. flash evaporation at 65° C.: putting the rolled granules into a flash evaporation drying device at 65° C. and heating for two hours to reduce a water content of fresh meat ingredients and concentrate nutrients;

S3. hot air slow drying at 85° C.: putting the flash-evaporated food granules on the drying frame, the hot air drying unit generating circulating hot air at 85° C., and the circulating conveying unit driving each drying frame to rotate for two hours to make a moisture of the granules slowly evaporate and form crispy granules;

S4. short-term heating at 100° C.: putting the slowly dried food granules into a baking equipment at 100° C. and heating for one hour to promote the raw materials to undergo a mild maillard reaction and reduce nutrient loss;

S5. cooling and detection: cooling the baked food granules, detecting their moisture content, the food granules meeting requirements entering a next process, and food granules not meeting the requirements being baked again.

* * * * *